United States Patent Office 3,290,143
Patented Dec. 6, 1966

3,290,143
PRODUCTION OF URANIUM METAL
Donald Duxbury, Lea, Preston, England, assignor to United Kingdom Atomic Energy Authority, London, England
No Drawing. Filed Feb. 24, 1965, Ser. No. 435,052
Claims priority, application Great Britain, Mar. 6, 1964, 9,737/64
11 Claims. (Cl. 75—122.7)

This invention relates to processes for the production of uranium metal.

A known process for the production of uranium involves the reduction of uranium tetrafluoride to uranium metal using metallic calcium or magnesium as the reducing agent. British Patent No. 780,974 discloses such a process.

In this process a mixture of the reactants, namely uranium tetrafluoride powder and magnesium raspings is compacted into pellets. The compacted pellets are loaded into a reaction vessel lined with a suitably inert substance such as graphite or sintered magnesium fluoride. The reaction vessel and contents are loaded into a furnace and argon is bled into the reaction vessel at a pressure of up to 15 lbs. above atmospheric, the heating of the furnace being maintained until the reaction is initiated. Molten uranium produced by the reaction collects in a catch pot at the base of the reactor vessel and solidifies into a solid reduction billet.

British Patent No. 933,436 describes a modification of the process described in British Patent No. 780,974 wherein the reactants are heated in the reaction vessel to the temperature of initiation of the reaction in at least two stages first heating to a temperature of the reaction whilst evacuating the reaction vessel and secondly continuing the heating under a blanket of inert gas to the initiation temperature.

For the manufacture of nuclear reactor fuel members from the uranium metal thus produced the reduction billet, after removal of adhering slag, is remelted and cast into the form of rods.

British Patent 863,492 discloses a process for adding iron and aluminium to uranium metal and subsequently beta quenching and alpha annealing a nuclear fuel member cast from the metal to give a refined grain structure and other satisfactory metallurgical properties. In the above method wherein the reduction billet is remelted for casting into rods the addition of iron and aluminium is conveniently carried out during the remelting stage.

As an alternative to the above method of production of cast rods by remelting of the reduction billet it is proposed to produce nuclear fuel members of rod-like form by direct extrusion of the reduction billet, the reduction billet being extruded to near the required rod dimensions. With this route no opportunity exists for iron and aluminium adjustment of the uranium metal subsequent to the reduction reaction.

According to the present invention in a method for the production of uranium metal by the reduction in a reaction vessel of uranium tetrafluoride using a metallic reducing agent such as calcium or magnesium a quantity of a reducible compound of iron and a quantity of a reducible compound of aluminium is included with the reactants in the reaction vessel, the amounts of the reducible iron and aluminium compounds included being as necessary to provide the required degree of iron and aluminium adjustment in the uranium metal produced by the reduction reaction.

In an alternative method in accordance with the invention a quantity of iron and a quantity of aluminium, both in uncombined metallic form are included with the reactants in the reaction vessel, the amounts of iron and aluminium included being as necessary to provide a required degree of iron and aluminium adjustment in the uranium produced by the reduction reaction.

The following are methods by means of which the iron and aluminium additions may be included in the reaction vessel with the reactants.

(a) The additions are made as either hydrated iron trifluoride and hydrated aluminium trifluoride or as the anhydrous trifluorides of iron and aluminium. The total quantity of iron and aluminium trifluoride required is divided equally between all the pellets of uranium tetrafluoride and metallic reducing agent in the charge, so that each pellet contains the correct proportion of each fluoride to give the required iron and aluminium levels in the uranium produced by its reaction.

(b) The total quantity of iron and aluminium trifluorides required in the charge to give the desired iron and aluminium levels in the uranium metal produced by the reaction is mixed separately with an excess of magnesium metal in particulate form, e.g. 8% above the stoichiometric amount required for reduction of the iron and aluminium trifluorides, and then the mixture is pelleted. The pellets produced are distributed uniformly throughout the normal pellets of uranium tetrafluoride and metallic reducing agent during build up of the charge in the reaction vessel.

(c) The additions are made as iron ad aluminium powder which can be distributed throughout the whole charge as in (a) above or used as separate pellets as in (b) above.

(d) The additions are made as iron and aluminium foils or wires the appropriate weight of each being included with the uranium tetrafluoride/magnesium pellets during build up of the charge in the reaction vessel.

The following are examples of methods in accordance with the invention.

The uranium tetrafluoride/magnesium reduction charge was prepared by mixing together 2.39 kilogrammes of uranium tetrafluoride powder and 0.402 kilogramme of magnesium raspings. Iron and aluminium additions were made to the charge by the addition of 0.72 gramme of anhydrous iron tetrafluoride ($FeF_3$) and 4.23 grammes of anhydrous aluminium trifluoride ($AlF_3$) to the mixture of uranium tetrafluoride and magnesium raspings followed by thorough mixing. The iron-aluminium adjusted uranium tetrafluoride/magnesium mixture thus produced was then compacted in a die form cylindrical pellets 4.75 inches in diameter and 2.75 inches high using a compacting pressure of 8 to 10 tonnes per square inch.

The weight of 0.402 kilogramme of magnesium used in the mixture includes an additional amount to provide for reduction of the iron and aluminium trifluorides.

91 pellets were then loaded into a reaction vessel of the kind described in British Patent No. 780,974, i.e. being capable of resisting the pressure generated during the reaction and lined with a suitably inert substance such as graphite or sintered magnesium fluoride. The reaction vessel with its contents was then loaded into a furnace and the rate of heating of the furnace was controlled so that initiation of the reaction took place approximately 110 minutes from commencement of heating of the reaction vessel. The reaction was carried out in accordance with the method described in British Patent No. 933,436 in that for the major part of the period from the commencement of heating (e.g. for the first 77 minutes) it was arranged that the reaction vessel was kept under continuous evacuation to a pressure of less than one centimetre of mercury and for the remainder of the heating period up to initiation of the reaction (e.g. for the last 33 minutes) argon was admitted into the reaction vessel at 10–15 lbs. above atmospheric pressure.

A temperature of 400° C. was reached when the evacuation was stopped that is 250° C. below the initiation temperature (650° C.) of the reaction. The uranium metal produced by this method was found on analysis to contain 240 p.p.m. of iron and 1,200 p.p.m. of aluminium which is within the range of 200–500 p.p.m. iron and 800–1200 p.p.m. of aluminium specified in British Pat. No. 863,492.

In a similar method to the above the iron and aluminium additions may be made to the uranium tetrafluoride/magnesium mixture in the form of powdered metallic iron and aluminium. In this case the weight of magnesium raspings used in the mixture is solely that required for the reduction of the uranium tetrafluoride.

In another method in accordance with the invention a uranium tetrafluoride/magnesium reduction charge was prepared by mixing together of 345.1 kilogrammes of uranium tetrafluoride powder and 57.62 kilogrammes of magnesium raspings. As in the previous examples the mixture was pressed in a die to form pellets 4.75 inches in diameter and 2.75 inches high.

146 grammes of iron trifluoride and 938 grammes of aluminium trifluoride were then mixed with 322 grammes of magnesium raspings (8% in excess of the stoichiometric amount required for reduction of the iron and aluminium fluorides). The mixture was then pressed to form 4 pellets of similar diameter to the uranium tetrafluoride magnesium pellets. The uranium tetrafluoride magnesium pellets were then stacked in the reaction vessel with the iron/aluminium fluoride containing pellets uniformly distributed through the stack of uranium tetrafluoride/magnesium pellets. As in the previous examples the reduction reaction was carried out in accordance with the method of British Patent No. 933,346, i.e. the reaction vessel was heated in a furnace and for the major part of the heating period (i.e. for the first 77 minutes) the heating was carried out with the reaction vessel under continual evacuation to a pressure of one centimetre of mercury. For the remainder of the heating period up to initiation of the reaction (e.g. approximately for 33 minutes), argon was admitted into the reaction vessel at a pressure of 10–15 lbs. above atmospheric pressure. A temperature of approximately 400° C. was reached when the evacuation was stopped, that is approximately 250° C. below the initiation temperature of the reaction. The uranium metal produced contained approximately 320 p.p.m. iron and approximately 850 p.p.m. aluminium.

The latter method may be modified in two ways.

Firstly as an alternative to the inclusion of pellets of a mixture of iron and aluminium trifluorides with magnesium in the reduction charge, pellets of a mixture of iron and aluminium metal powders may be included in the stack of uranium tetrafluoride/magnesium pellets in the reaction vessel.

As a second alternative to the inclusion of pellets of a mixture of iron and aluminium trifluorides with magnesium in the reduction charge iron and aluminium wires or foils may be added to the reduction charge. For a reduction charge as described above made up of pellets of a mixture containing 217.5 kilogrammes of uranium tetrafluoride and 39.4 kilogrammes of magnesium raspings, iron wire having a total weight of 66 grammes and aluminium foils having a total weight of 130 grammes were included in the stack of uranium tetrafluoride/magnesium pellets in the reaction vessel. The iron and aluminium foils were distributed throughout the stack or uranium tetrafluoride/magnesium pellets, being placed in the stack on the upper surface of individual pellets. Uranium metal produced by this process was found to contain approximately 550 p.p.m. iron and approximately 895 p.p.m. aluminium.

When using fluorides in the methods described above, the hydrated as well as the anhydrous salts may be used but the anhydrous salts are preferred to the hydrated form as the use of hydrated fluorides gives rise to vigorous reactions.

I claim:

1. A method for the production of uranium metal containing alloying additions of iron and aluminum by heating the reactants, uranium tetrafluoride, a reducible compound of iron, a reducible compound of aluminum and a metallic reducing agent selected from the group consisting of magnesium and calcium in a reaction vessel, comprising the steps of forming a mixture of the uranium tetrafluoride and the metallic reducing agent, compacting the mixture into pellets, charging the pellets into a reaction vessel, the reducible compound of iron and the reducible compound of aluminum being included in the reaction vessel with the pellets, followed by heating of the reactants in the reaction vessel.

2. A method for the production of uranium metal as claimed in claim 1, wherein the reducible compound of iron is hydrated iron trifluoride and the reducible compound of aluminium is hydrated aluminium trifluoride.

3. A method for the production of uranium metal as claimed in claim 1, wherein the reducible iron compound is anhydrous iron trifluoride and the reducible aluminium compound is anhydrous aluminium trifluoride.

4. A method for the production of uranium metal as claimed in claim 1, the reducible iron compound included with the reactants being hydrated iron trifluoride, the reducible aluminium compound included with the reactants being hydrated aluminium trifluoride, the total quantity of hydrated iron trifluoride and hydrated aluminium trifluoride included being divided equally between all the pellets of uranium tetrafluoride and metallic reducing agent in the charge.

5. A method for the production of uranium metal as claimed in claim 1, the reducible iron compound included with the reactants being anhydrous iron trifluoride, the reducible aluminium compound included with the reactants being anhydrous aluminium trifluoride, the total quantity of anhydrous iron trifluoride, and anhydrous aluminium trifluoride included being divided equally between all the pellets of uranium tetrafluoride and metallic reducing agent in the charge.

6. A method for the production of uranium metal as claimed in claim 1, the reducible iron compound included with the reactants being hydrated iron trifluoride and the reducible aluminium compound included with the reactants being hydrated aluminium trifluoride, and including the step of forming a mixture of hydrated iron and aluminium trifluoride separately with an amount of particulate metallic reducing agent in excess of the stoichiometric amount required for reduction of the hydrated iron and aluminium trifluorides, and pressing the last said mixture to form pellets, the pellets so produced being distributed uniformly throughout the normal pellets of uranium tetrafluoride and metallic reducing agent during build up of the pellets into a charge in the reaction vessel.

7. A method for the production of uranium metal as claimed in claim 1, the reducible iron compound included with the reactants being anhydrous iron trifluoride, and the reducible aluminium compound included with the reactants being anhydrous aluminium trifluoride, and including the step of mixing the anhydrous iron and aluminium trifluorides separately with a amount of particulate metallic reducing agent in excess of the stoichiometric amount required for reduction of the anhydrous iron and aluminium trifluorides and pressing the last said mixture to form pellets, the pellets so produced being distributed uniformly throughout the normal pellets of uranium tetrafluoride and metallic reducing agent during build up of the pellets into a charge in the reaction vessel.

8. A method for the production of uranium containing alloying additions of iron and aluminum by heating uranium tetrafluoride, a metallic reducing agent selected from the group consisting of calcium and magnesium and iron and aluminum in uncombined metallic form in a reaction vessel, comprising the steps of forming a mixture of the reactants uranium tetrafluoride and the metallic reducing agent, compacting the mixture into pellets, charging the pellets into a reaction vessel, iron and aluminum in uncombined metallic form being included in the reaction vessel with the pellets, followed by heating of the reaction vessel to bring about reduction of the uranium tetrafluoride by the metallic reducing agent.

9. A method for the production of uranium metal as claimed in claim 8, wherein the reactants, uranium tetrafluoride and metallic reducing agent in particulate form, are mixed together with iron powder and aluminium powder, the mixture of uranium tetrafluoride, the metallic reducing agent and the iron and aluminium powders being pressed to form pellets which are loaded as a charge into the reaction vessel.

10. A method for the production of uranium metal as claimed in claim 8, including the step of forming a mixture of metallic iron and aluminum powders, pressing the last said mixture to form pellets, the pellets of the mixed iron and aluminium powders being distributed uniformly throughout the pellets of uranium tetrafluoride and metallic reducing agent during build up of the pellets into a charge in the reaction vessel.

11. A method for the production of uranium metal as claimed in claim 8, iron and aluminum foils or wires being distributed uniformly throughout the charge of pellets of uranium tetrafluoride and a metallic reducing agent as the pellets are built up into the charge in the reaction vessel.

References Cited by the Examiner
UNITED STATES PATENTS 3,010,890 11/1961 Jepson et al. _____ 75—122.7 X
3,088,822 5/1963 Lloyd et al. _____ 75—84.1

OTHER REFERENCES

A.E.C. Bulletin CT–2712, June 26, 1945, Spedding et al., p. 3.

BENJAMIN R. PADGETT, *Primary Examiner.*

M. J. SCOLNICK, *Assistant Examiner.*